A. C. SEEGER.
CAR FENDER.
APPLICATION FILED APR. 9, 1909.
949,200.
Patented Feb. 15, 1910.
3 SHEETS—SHEET 3.
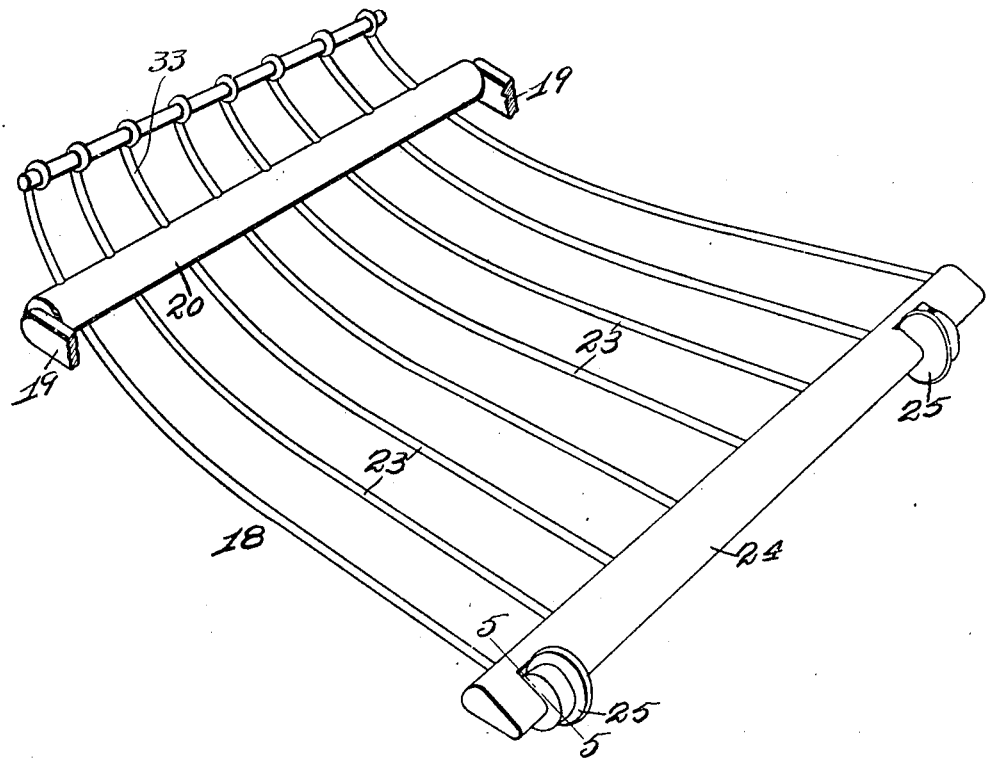
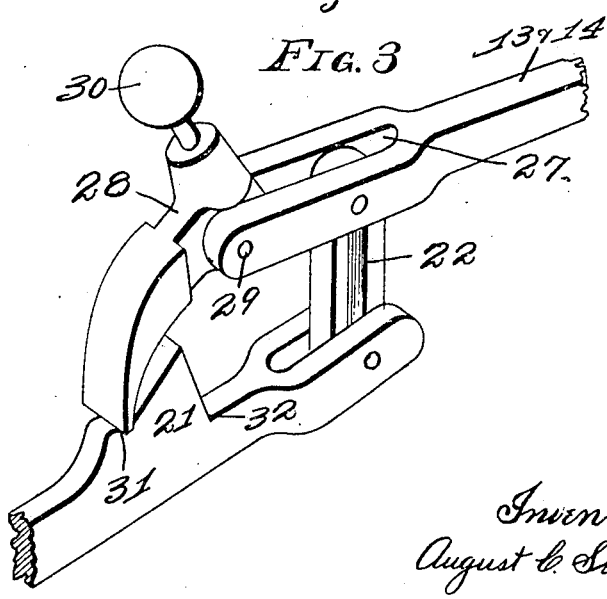
Witnesses
H. C. Stein
L. A. L. McIntyre
Inventor
August C. Seeger
by Hopkins & Eicks Attys.

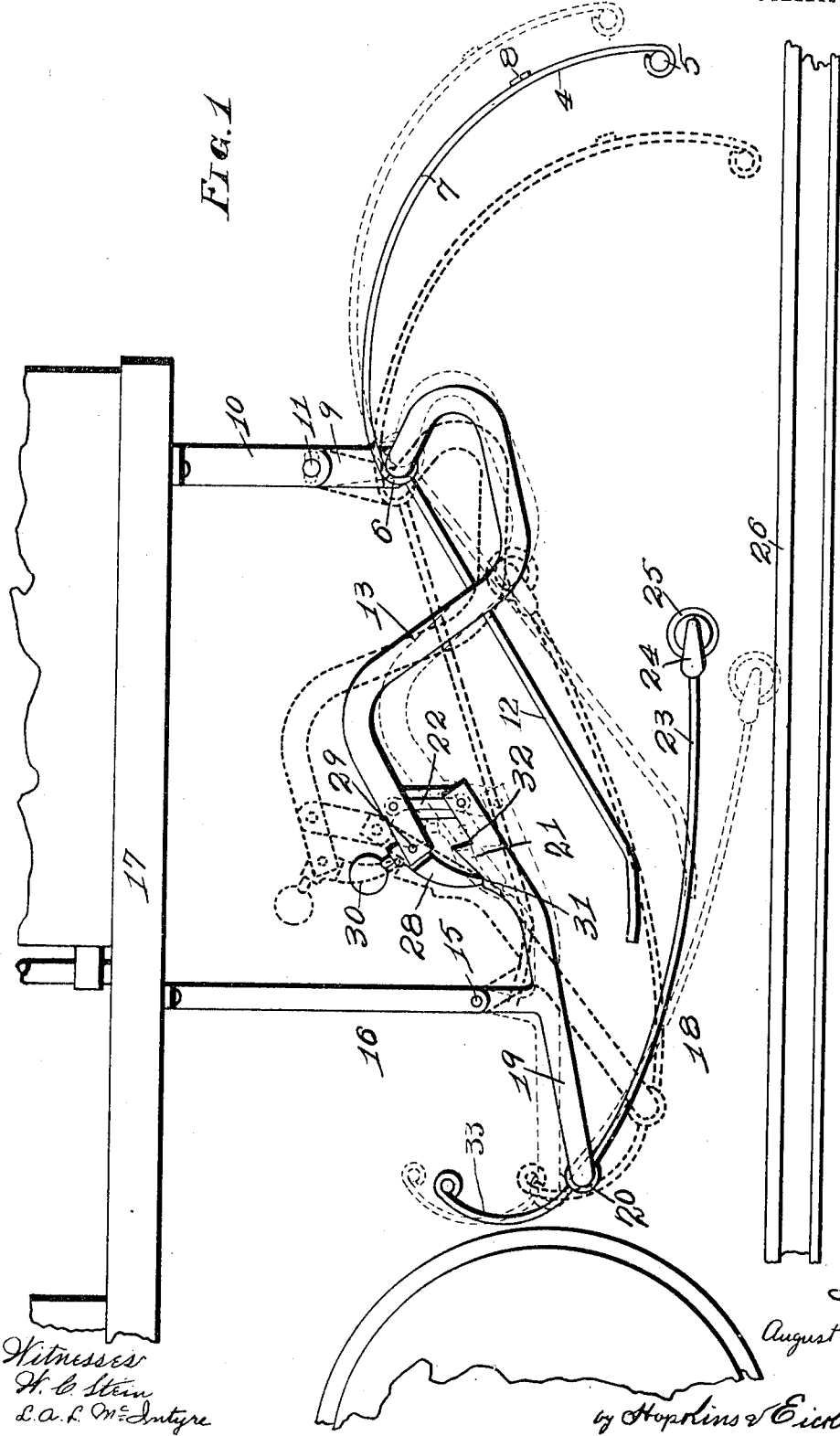

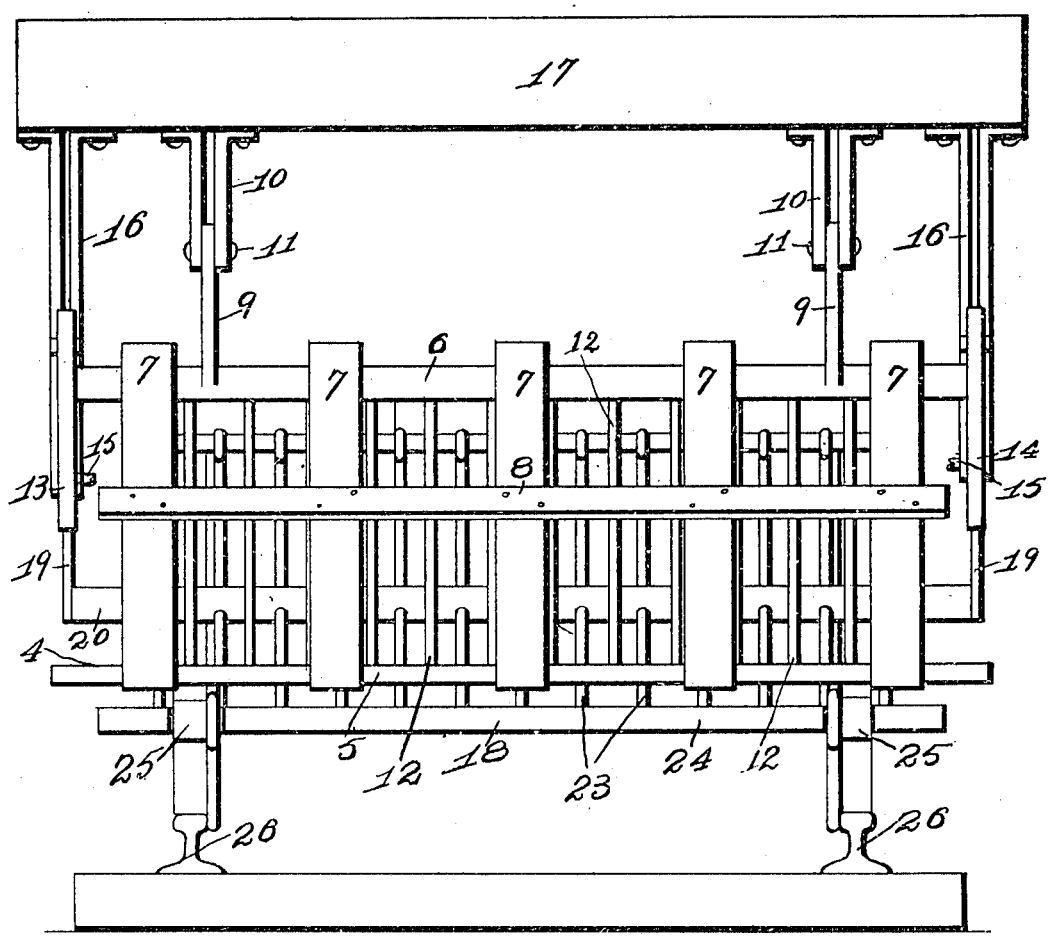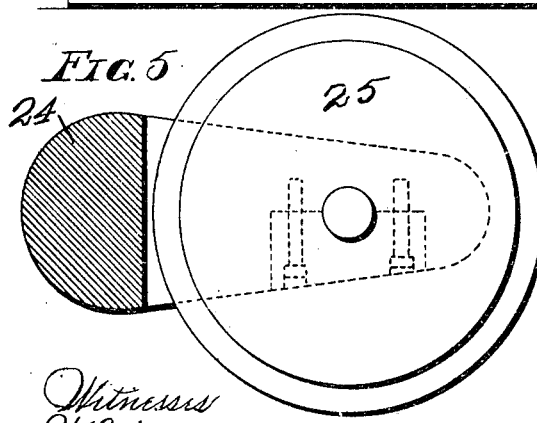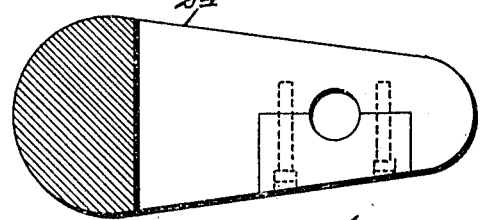

UNITED STATES PATENT OFFICE.

AUGUST C. SEEGER, OF EAST ST. LOUIS, ILLINOIS, ASSIGNOR OF ONE-HALF TO WILLIAM HENRY FROGGATT, OF EAST ST. LOUIS, ILLINOIS.

CAR-FENDER.

949,200.   Specification of Letters Patent.   Patented Feb. 15, 1910.

Application filed April 9, 1909. Serial No. 488,997.

*To all whom it may concern:*

Be it known that I, AUGUST C. SEEGER, a citizen of the United States, and resident of East St. Louis, Illinois, have invented certain new and useful Improvements in Car-Fenders, of which the following is a specification.

My invention relates to an improved car fender and has for its object to provide a fender in which a pilot-member, when struck by an obstruction, throws a scoop or trap-member into contact with the rails, which trap-member in turn catches and holds the obstruction.

In the drawings: Figure 1 is a side elevation of a device embodying my invention in place upon a car, and indicating in dotted lines the several positions assumed by the various parts when in operation. Fig. 2 is a front elevation of the same. Fig. 3 is an enlarged perspective view of the releasing catch employed in the device of my invention. Fig. 4 is an enlarged perspective view of the lower portion of the trap-member employed in the device of my invention. Fig. 5 is a transverse sectional view of the bar 24 taken along the line 5—5 of Fig. 4, showing the wheel 25 in place, and Fig. 6 is a similar view of the bar 24 with the wheel 25 removed.

As shown in the drawings, I provide a pilot-member 4 comprising a lower transverse bar 5 and an upper transverse bar 6, parallel with the first-named bar and secured thereto by curved resilient fingers 7; said fingers 7 being re-inforced about midway their length by the strengthening bar 8. The upper bar 6 is provided with two upwardly projecting arms 9—9 which are pivotally mounted and permitted to operate in elongated openings formed in the brackets 10—10 at the point indicated by the numeral 11. The bar 6 is also provided with rearwardly extending non-resilient fingers 12; and at each of its ends the bar 6 has the rearwardly projecting arms 13 and 14. The cross-bar 15 is mounted in the brackets 16—16 which depend from the car-body 17. Upon the bar 15 is pivotally suspended the scoop or trap-member 18 by means of the suspension members or side bars 19—19 which are joined at their rear extremities by the transverse bar 20 and each of which has its forwardly extending portion provided with a double-toothed ratchet 21; and its end in front of said ratchet connected with the corresponding arm 13 by means of the link 22. The cross-bar 20 is provided with forwardly projecting arms 23 terminating in the transverse bar 24, which bar 24 is provided with bearing wheels 25 which are in alinement with the rails 26—26. The bar 20 is also provided with the upwardly projecting arms 33.

The rear extremities of the arms 13 and 14 are bifurcated as indicated by the numeral 27 to receive the dogs 28 which are pivotally mounted at the point indicated by the numeral 29, and are provided with counter-balancing weights 30. By the engagement of the dogs 28 with the lower tooth 31 of the ratchet member 21 together with the links 22, the arms 23 are held elevated from the rails (see Fig. 1), the bar 5 of the pilot-member 4 being also elevated at a considerable distance above the rails 26. Upon the bar 5 and the vertical members 7 of the pilot-member 4 receiving the impact of an obstruction, the dog 28 is released from the engagement of the ratchet-member 21 by the sudden jolt, and the arm 13, together with the arm 9—9, moves slightly forward in the slotted brackets 10—10, thus permitting the arms 23 to descend to a point where the wheels 25 contact with the rails 26, this position being shown by dotted lines in Fig. 1. The obstruction is then received upon the arms 23 to a point where such obstruction strikes the rearwardly projecting fingers 12, when, by reason of the pivotal connection between the pilot-member and trap-member, the arms 23 are again thrown upwardly as shown by heavy dotted lines in Fig. 1 to a point where the dog 28 finds engagement with the depression 32 of the ratchet-member 21. The obstruction being thus caught the arms 23 will be held in such elevated position until the dogs 28 are released by hand and the obstruction removed from the arms 23.

The particular object of my invention is to insure the safety of persons or animals struck by the pilot-member 4 of the vehicle to which the fender is attached until removed.

Having fully described my invention, what I claim as new and desire to have secured to me by the grant of Letters Patent, is:

1. In a car fender, the combination of a car-body; a pilot-member pivotally connected to the brackets suspended beneath the car-body; a scoop or trap-member slidably mounted on the car-body behind the pilot-member and having movable connection with said pilot-member; a dog in conjunction with a link whereby the scoop or trap-member is normally held in an elevated position and adapted to release the same when a shock is imparted to the pilot-member, permitting the scoop or trap-member to contact with the rails; and rearwardly projecting arms mounted on the pilot-member, substantially as described.

2. In a car fender, the combination of a car-body; a pilot-member pivotally mounted under said car-body and near the front thereof; a scoop or trap-member pivotally connected to a bracket suspended under the car-body in the rear of the pilot-member, and having movable connection with the pilot-member; a dog-and-ratchet mechanism and a link interposed between said pilot-member and scoop or tray-member whereby the scoop or trap-member is normally held in elevated position; means whereby a shock to the pilot-member releases the scoop or trap-member to contact with the rails; and rearwardly projecting arms mounted on the pilot-member, substantially as described.

3. In a car fender, the combination of a car body; a pilot-member supported in brackets suspended to the under side of the car body, said pilot-member being tiltingly mounted; a trap-member similarly mounted behind the pilot-member; a link connecting the pilot-member and trap-member; a dog carried by the pilot-member and arranged to engage with teeth on the trap-member, the dog being so arranged as to disengage the teeth of the trap-member and permit the trap-member and pilot-member to tilt downwardly when a shock is imparted to the pilot-member, substantially as described.

In testimony whereof, I have signed my name to this specification, in presence of two subscribing witnesses.

AUGUST C. SEEGER.

Witnesses:
JAMES L. HOPKINS,
WALTER C. STEIN.